Sept. 17, 1968     S. T. SHEARS     3,401,435

PLACKET FASTENER

Filed April 26, 1966

Inventor:
Stuart T. Shears,
by James R O'Connor
Atty.

United States Patent Office 3,401,435
Patented Sept. 17, 1968

3,401,435
PLACKET FASTENER
Stuart T. Shears, Belmont, Mass., assignor to United-Carr Incorporated, Boston, Mass., a corporation of Delaware
Filed Apr. 26, 1966, Ser. No. 545,370
5 Claims. (Cl. 24—224)

ABSTRACT OF THE DISCLOSURE

In a snap fastener combination the male member has an upstanding, undercut stud having an axially extending notch formed in one face thereof and the female member includes a keeper portion having a pair of resilient arms which terminate in free opposed ends and are internally contoured to define an elongated stud receiving slot. A projection extending from the ends of the arms into the slot seats in the notch in the stud to inhibit accidental lateral separation of the arms when the stud is seated in the end of the slot adjacent the free ends of the arms.

---

The present invention relates generally to fasteners and more particularly to a placket fastener for securing juxtaposed or overlapping portions of a garment.

An object of the invention is to provide a simple, inexpensive, and highly efficient placket fastener.

Another object of the invention is to provide a placket fastener comprising male and female members wherein the female member is adapted to be hooked onto the male member as the juxtaposed portions of the garment are drawn together and snapped from the male member by a force exerted on the components in a direction generally normal thereto to unfasten the garment.

A further object of the invention is to provide a placket fastener comprising male and female members which may be released by rotating one of the members with respect to the other.

A still further object of the invention is to provide a placket fastener embodying a locking feature which prevents accidental disengagement of the male and female members.

Other objects and advantages of the novel fastener combination will become evident from a reading of the following detailed description in conjunction with a viewing of the accompanying drawings in which.

Figure 1:
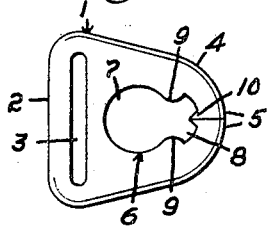
FIG. 1 is a plan view of the female member of the fastener combination.
Figure 2:
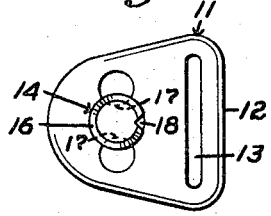
FIG. 2 is a plan view of the male member of the fastener combination.

While it is envisioned that the invention could be used in a plurality of ways and with many different garments, the need for an improved fastener to be employed in fastening the front of a woman's brassiere was the principal motivating force behind its development. Thus, for purposes of illustration, the fastener has been depicted and will hereinafter be described in connection with that application.

The fastener components are of a molded, synthetic, resinous material, for example, the acetal resin marketed by Du Pont under the trade name "Delrin."

The female member 1 includes a base portion 2 having a strap-receiving slot 3 formed therein, a pair of generally hook-shaped resilient arms 4 which extend outwardly from the base 2 and terminate in abutting juxtaposed free ends 5 remote from the base 2, and an elongated slot 6 defined by the inner, contoured edges of the arms 4. The slot 6 includes an enlarged, generally circular portion 7 which opens into a smaller, generally heart-shaped portion 8. The smaller portion 8 is defined by the opposed, inwardly extending, arcuate lugs 9 and a pair of complementary prongs on the ends 5 of the arms 4 which form a wedge-shaped projection 10 extending rearwardly toward the base 2.

Figure 3:
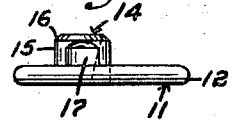
FIG. 3 is a side elevation of the male member shown in FIG. 2.

The male member 11 includes a base portion 12 having a strap-receiving slot 13 and an integral stud 14 extending upwardly from and generally perpendicular to the base 12. The stud 14 has a generally cylindrical lower portion 15 and an upper frustro conical portion 16. The lower portion 15 of the stud is provided with undercut arcuate cavities 17 and the portion of the post facing the slot 13 has a V shaped notch 18 extending angularly inwardly the full length thereof (as shown by the slanting dotted lines in FIGS. 3 and 6). Finally, with respect to the male member 11, it should be noted that the openings in the base 12 adjacent the stud 14 result from the method and tools employed to form the undercut cavities 17 and the notch 18 and serve no function in the invention.

Figure 4:
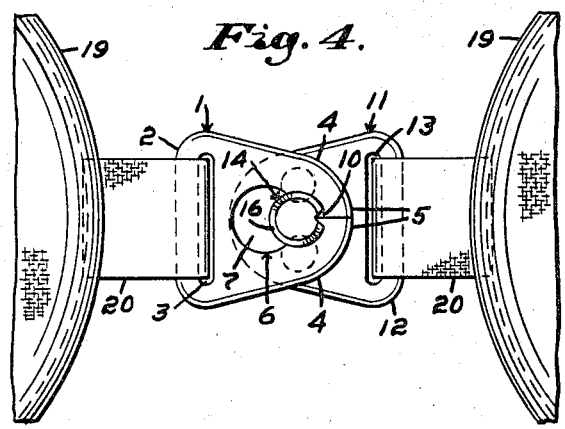
FIG. 4 is a front view of an installation depicting the placket fastener as employed to secure, in front of the wearer, the juxtaposed cups of a brassiere.

FIG. 4 depicts the inside edges of the cups 19 of a brassiere having straps 20 looped through the slots 3 and 13 of the fastener components and stitched to the edges of the cups. The outside edges of the cups (not shown), according to the usual arrangement, have a band of stretch fabric secured thereto, which band extends around the back of the wearer and is placed in tension when the cups are drawn together. Thus, to fasten the brassiere, the wearer need only insert the stud 14 into the enlarged opening 7 in the female member and thereafter pull the components in opposite directions laterally to cause the stud to snap into the smaller portion 8 of the slot whereby the lugs 9 will automatically seat in the undercut cavities 17 and the wedge-shaped projection 10 will seat in the notch 18. Since the elastic back strap maintains a constant tension on the cups 19 there is a corresponding continuous pull on the fastener components which, in addition to the lugs 9, prevents the stud 14 from moving back into registration with the opening 7. Further, the seating of the lugs 9 in the cavity 17 prevents the socket from being accidentally rocked off the stud in a direction normal to the wearer and the engagement of the prongs forming the projection 10 with the sides of the notch 18 prevents the arms 4 from being drawn apart to allow the stud to slide free of the socket when excessive lateral pull is applied to the components. It should also be noted that by reason of the inwardly slanting configuration of the notch 18, tension applied to the components tends to draw the projection 10 downwardly into the deeper portion of the notch adjacent the base 12 of the male member. Thus, the fastener components are effectively locked against separation under normal conditions.

Figure 6:
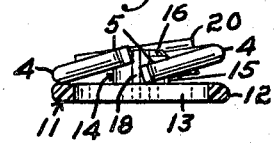
FIG. 6 is a section taken on line 6—6 of FIG. 5.
Figure 5:
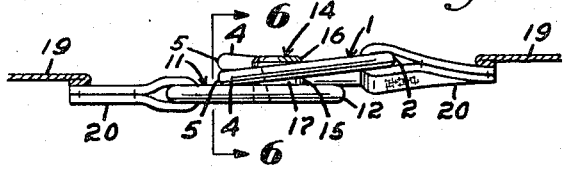
FIG. 5 is an edge view partly in section looking on the top edge of the device of FIG. 4 as the female member is being snapped from the male member.
Figure 7:
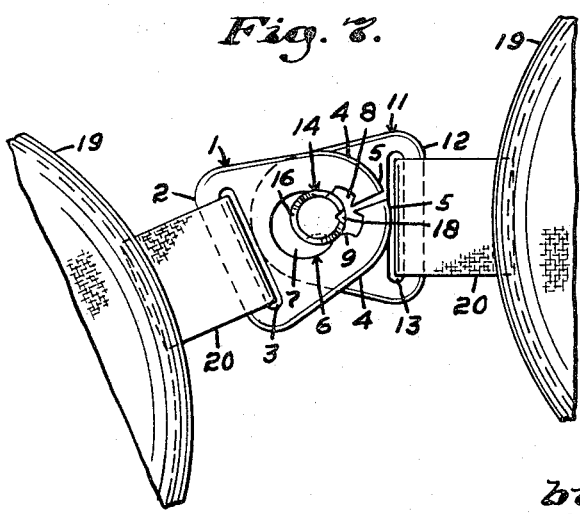
FIG. 7 is a front view similar to FIG. 4 showing the female member as it is being rotated to disengage it from the male member.

As shown in FIGS. 5, 6, and 7 the fastener components may be rapidly released by relative movement thereof in two different directions. In FIGS. 5 and 6 the female member is snapped off the stud by twisting it away from the stud so that the lower arm 4 (the left arm in FIG. 6) acts as a pivot. As is readily observed, the twisting action causes the arms to spread apart and the upper lug 9 rides out of its cavity 17 and thence over the top of the stud to complete the disengagement. Once released, the resilient arms 4 spring back to the position shown in FIG. 4.

In FIG. 7 the female member is rotated downwardly, with the upper lug 9 acting as a pivot, and in the same motion is pushed towards the opposite cup 19. This action causes the arms to spread slightly and the lower lug 9 rides out of the lower cavity 17, whereupon the stud is re-aligned with the opening 7 and the female member lifted free thereof.

While one form of the invention has been described in detail, it is to be clearly understood that the disclosure is to be interpreted in an illustrative rather than a limiting sense in that it is envisioned that modifications of the fastener might be accomplished without departing from the scope of the invention as set forth in the following claims.

I claim:

1. A fastener combination for securing the ends of a garment which is placed in tension on the wearer when secured comprising a male fastener member and a female fastener member, each of said members being adapted to be attached to the garment adjacent an edge thereof, said male member having a base portion and a solid stud extending upwardly from said base portion, said stud having at least one undercut formed in its periphery and an axially extending notch spaced from said undercut, said female member having a base portion and a keeper portion extending laterally from said base portion, said keeper portion including a pair of resilient arms which terminate in free opposed ends remote from said base portion, said arms having contoured internal edges defining an elongated slot including a portion having a width substantially greater than said stud, an adjoining portion having a width substantially equal to that of said stud and an interconnecting portion having a width substantially less than either of said first mentioned portions and an internal projection extending from the ends thereof toward said base portion, whereby said stud may be passed through said larger portion of said slot and snapped laterally into the adjoining portion of said slot so that the portions of said edges defining said interconnecting portion will seat in the undercut in said stud and said projection will seat in the notch in said stud to lock said members and secure the ends of the garment against accidental separation.

2. A fastener combination according to claim 1 wherein said fastener members are of a molded, synthetic resinous material.

3. A fastener combination according to claim 1 wherein the base portion of each of said components is provided with a slot to receive a strap attached to an end of the garment.

4. A fastener combination for securing a pair of straps attached to a stretchable garment which is placed in tension on the wearer when the straps are secured comprising male and female fastener members, said male member including a base portion havings trap-receiving means and a solid stud extending upwardly from said base portion, said female member including a base portion having strap-receiving means, a pair of resilient arms extending laterally from said base portion and terminating in free opposed ends remote from said portion and an elongated slot defined by the internal edges of said base portion and said arms, said slot having an enlarged, generally circular portion opening into a smaller stud-receiving opening, said arms having a pair of opposed, inwardly extending lugs forming a constriction between said larger and smaller openings and a wdege-shaped projection extending from the free ends of said arms into said smaller opening, said stud having undercut cavities formed in its sides and a notch formed in one end thereof, said stud being adapted to be passed through said enlarged opening in said slot and to be snapped laterally into said smaller opening so that said lugs seat in said cavities and said wedge-shaped projection seats in said notch to lock said male and female members.

5. A snap fastener combination comprising a male member and a female member, said male member having a base including a strap-engaging portion and a stud extending upwardly from said base, said stud having an axially extending notch formed therein and opening toward the strap-engaging portion of said base, said female member having a base including a strap-engaging portion and a keeper portion extending laterally from said base and away from said strap-engaging portion, said keeper portion including a pair of resilient arms which terminate in free opposed ends remote from said base, said arms having contoured internal edges defining an elongated stud receiving slot including an enlarged portion adjacent said base and a narrower communicating portion adjacent the free ends of said arms, said arm having an internal projection extending from the ends thereof toward said base which seats in said notch in said stud when the latter is pressed into the narrower portion of said slot to inhibit accidental lateral separaiton of said arms when said fastener members are connected under normal usage conditions.

References Cited

UNITED STATES PATENTS

| 278,430 | 5/1883 | Henius | 24—224 |
| 457,532 | 8/1891 | Harlow | 24—224 X |
| 970,931 | 9/1910 | Kramer | 24—224 |

BOBBY R. GAY, *Primary Examiner.*

E. SIMONSEN, *Assistant Examiner.*